United States Patent [19]

Braunsperger et al.

[11] 4,130,632

[45] Dec. 19, 1978

[54] PROCESS FOR THE MANUFACTURE OF TRICHLOROSILANE AND SILICON TETRACHLORIDE

[75] Inventors: Johann Braunsperger, Buch, Inn; Winfried Lang; Thorgard Zainer, both of Burghausen, all of Fed. Rep. of Germany

[73] Assignee: Wacker-Chemitronic Gesellschaft für Elecktronik-Grundstoffe mbH, Burghausen, Fed. Rep. of Germany

[21] Appl. No.: 795,467

[22] Filed: May 10, 1977

[30] Foreign Application Priority Data

May 25, 1976 [DE] Fed. Rep. of Germany ....... 2623290

[51] Int. Cl.$^2$ .......................... C01B 33/08; C01F 7/56; C01G 49/10
[52] U.S. Cl. .................... 423/342; 423/493; 423/495; 55/71
[58] Field of Search ............... 423/341, 342, 136, 135, 423/495; 423/149, 493; 55/71, 72

[56] References Cited

U.S. PATENT DOCUMENTS 3,865,920   2/1975   Dunn ............................... 423/493 X

FOREIGN PATENT DOCUMENTS 595434   3/1960   Canada ..................................... 423/342

Primary Examiner—Jack Cooper
Attorney, Agent, or Firm—Allison C. Collard; Thomas M. Galgano

[57] ABSTRACT

Trichlorosilane or silicon tetrachloride is prepared by reacting metallic aluminum-containing silicon in a reaction zone with hydrogen chloride or chlorine at a temperature between about 260° and about 1200° C, the reaction gas is then cooled to 40° to 130° in a cooling zone through which the velocity of flow is maintained at between 3 and 30 meters per second, and finally filtered.

2 Claims, 1 Drawing Figure

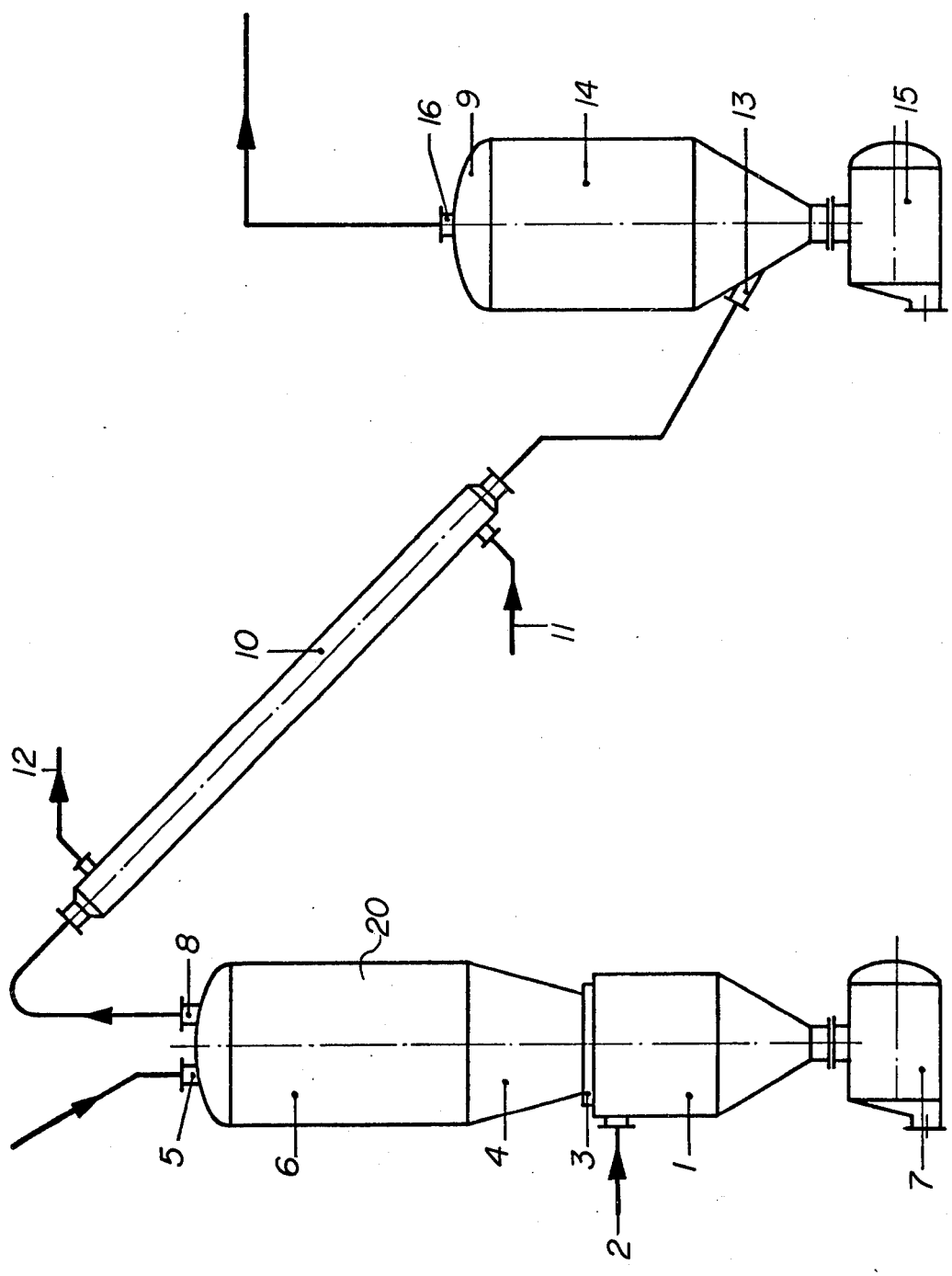

PROCESS FOR THE MANUFACTURE OF TRICHLOROSILANE AND SILICON TETRACHLORIDE

BACKGROUND OF THE INVENTION

The subject matter of the present invention is a process for the manufacture of trichlorosilane and/or silicon tetracholoride by reacting metallic, aluminum-containing silicon at 260° to 1200° C. with hydrogen chloride or chlorine and subsequently separating the resulting reaction mixture.

Crude silicon contains up to 2% by weight of aluminum and iron in the form of impurities. In the manufacture of trichlorosilane and silicon tetrachloride from crude silicon and hydrogen chloride, these impurities are converted to aluminum chloride ($AlCl_3$) and ferrous chloride ($FeCl_2$). Under normal reaction conditions, unlike the ferrous chloride, all the aluminum chloride emerges from the reaction zone at temperatures above 260° C. in gaseous form owing to its relatively high vapor pressure, and is deposited in the form of a white to yellowish crystal mass on the walls of the separation and condensation system connected to the reaction zone. In the reaction of crude silicon with chlorine, in addition to aluminum chloride, ferric chloride ($FeCl_3$) is formed which behaves in a corresponding manner. As a result, the insides of the pipes become encrusted and clogged and the cooling devices used become obstructed. Consequently, it is often necessary after a short time for the pipe systems to be opened and freed of the aluminum chloride that has crystallized out onto them. As a result of the fact that trichlorosilane, silicon tetrachloride and aluminum chloride are extremely readily hydrolysable and owing to the combustibility of trichlorosilane and the high-boiling chlorosilanes produced in side reactions, apart for there being general work-hygiene problems, considerable costs are also incurred. In addition it is necessary to use coolers that have a large surface area, or scraper coolers in which the wall deposit which forms is continuously scraped off by means of built-in rotating components. Rinsing out the solid material that has been scraped off and covering the shaft guide means in particular, present problems here, however.

GENERAL DESCRIPTION OF THE INVENTION

The object underlying the invention is therefore to find a process for the manufacture of trichlorosilane and/or silicon tetrachloride, in which it is possible for aluminum chloride and, where applicable, ferric chloride, to be separated from the reaction gas without problem.

This object is achieved by inserting directly after the reaction zone, a cooling zone which cools the reaction gas to a temperature of 40° to 130° C. for its entry into the filters arranged upstream of the following condensation system.

The invention will be better understood by reference to the accompanying drawing, which shows schematically an arrangment of apparatus suitable for carrying out the process.

Referring to the drawing:

Gaseous hydrogen chloride or chlorine is blown into the lower portion 1 of the reactor 20 through an inlet pipe 2. The gas flows upward through the sieve plate 3 through a fluidized bed 4 of ground crude silicon, which is introduced continually through an inlet pipe 5 into the upper portion 6 of the reactor 20 in accordance with its consumption. There is connected to the lower portion 1 of the reactor a removable dust container 7, which collects the solid materials that have been separated by the sieve plate 3.

The chlorine gas or the gaseous hydrogen chloride is converted by the crude silicon in the fluidized bed 4 to silicon tetrachloride or trichlorosilane respectively. In addition, a series of other gaseous reaction products, such as higher chlorosilanes, are produced and, in the case of hydrogen chloride, of course, hydrogen is produced as a reaction gas. The iron and aluminum contained in the crude silicon are converted to iron chloride and aluminum chloride and are removed with the reaction gas through the pipe 8. Since the reaction of hydrogen chloride or chlorine is carried out at a temperature of 260° to 1200° C., when the reaction product gas leaves the reactor, it has a temperature of at least 250° C.

In accordance with the invention, this reaction gas is then cooled, in the path between the reactor and the filter housing 9, arranged upstream of the condensation system 10, to a temperature of 40° to 130° C., preferably 60° to 80° C. For this purpose, a tube 10 provided with a cooling jacket through which a suitable cooling liquid, for example, water, is pumped by way of the pipes 11 and 12, is preferably used.

The selection of the correct tube cross-section and the size of the total cooling surface area, are particularly important here, since, if the tube diameters are too large and therefore the rate of flow too slow, and if the cooling is too intense, dust and aluminum chloride will be deposited on the walls of the tube.

The internal diameter of the tube 10 must therefore be so selected that in a given plant, a stream velocity of the reaction gas of 3 to 30 m/sec, preferably 6 to 15 m/sec is insured. The cooling is so adjusted that the reaction gas has a temperature of 40° to 130° C., preferably 60° to 80° C., when it enters the inlet pipe 13 of the filter housing 9. Within this temperature range, in the case of a high aluminum content in the crude silicon used, a higher temperature is selected and in the case of a low aluminum content, a correspondingly lower temperature is selected. The same applies to the reaction with chlorine, in which, in addition to the aluminum content, it is also necessary to observe the iron content.

Most of the aluminum chloride is precipitated out in this cooling path. The individual aluminum chloride crystals are prevented from joining together, however, by the silicon and iron chloride dust emerging directly from the reactor, irrespective of whether this is a solid bed or fluidized bed reactor, so that the aluminum chloride cannot become attached to the cooled walls of the tube 10, but is deposited in the filters 14 of the filter housing 9. The dust, consisting of silicon, iron chloride and aluminum chloride, continuously falls out of the filters 14, on account of its weight, into the dust container 15, attached to the lower portion of the filter housing 9, but some of the dust also falls directly into the dust container immediately after entering the filter housing. From time to time, the filter is blown free by means of a stream of gas from the opposite direction. The dust container 15 can be emptied simply by tipping.

The reaction gas, which is free of solid substances and in the case of reaction of silicon with hydrogen chloride contains approximately 45 to 50% by volume of hydrogen, approximately 45% by volume of trichlorosilane, approximately 5% by volume of silicon tetrachloride and a few % by volume of hydrogen chloride, leaves the filter housing 9 through the gas outlet pipe 16 and is separated into its constituents in the condensation system connected thereto.

The process also renders possible, by simple means, an essentially quantitative separation of aluminum chloride ($AlCl_3$) and, in the case of the reaction of silicon with chlorine, also of ferric chloride ($FeCl_3$), which behaves in a similar manner, before the reaction gas enters the condensation system.

As a result of the considerable increase in the life of reactor systems brought about thereby, a marked increase in productivity and capacity can be achieved.

What is claimed is:

1. A process for the preparation of trichlorosilane and silicon tetrachloride, comprising the steps of:

reacting silicon containing up to 2% by weight of aluminum and iron in a reaction zone with a member selected from the group consisting of hydrogen chloride and chlorine at a temperature of between 260° C. and 1200° C. to produce silicon-containing reaction gases comprising trichlorosilane and silicon tetrachloride;

passing the reaction gases with a velocity flow of between about 6 and 15 meters per second through a water-cooled tube to effect cooling thereof to a temperature of between about 40° C. and 130° C. to cause precipitation of solid substances composed of aluminum chloride and ferric chloride within said tube but to prevent precipitation of said solid substances on the walls of said tube;

passing the cooled gases containing the precipitated solid substances leaving said tube to a filtering device to filter off said solid substances and then passing the gases leaving the filtering device to a condensation system to separate out the trichlorosilane and silicon tetrachloride, said filtering device having filters on which said solid substances are deposited and a container in which the precipitated solid substances may be collected.

2. A process for the preparation of trichlorosilane and silicon tetrachloride, comprising the steps of:

reacting silicon containing up to 2% by weight of aluminum and iron in a reactive zone with a member selected from the group consisting of hydrogen chloride and chlorine at a temperature of between 260° C. and 1200° C. to produce silicon-containing reaction gases comprising trichlorosilane and silicon tetrachloride passing the reaction gases with a velocity flow of between about 6 and 15 meters per second through a water-cooled tube to effect cooling thereof to a temperature of between about 40° C. and 130° C. to cause precipitation of solid substances composed of aluminum chloride and ferric chloride within said tube but to prevent precipitation of said solid substances on the walls of said tube;

passing the cooled gases containing the precipitated solid substances leaving said tube to a filtering device to filter off said solid substances and then passing the gases leaving the filtering device to a condensation system to separate out the trichlorosilane and silicon tetrachloride.

* * * * *